United States Patent [19]

Priore

[11] Patent Number: 4,611,997

[45] Date of Patent: Sep. 16, 1986

[54] MOTIVATIONAL TEACHING AID FOR BEHAVIOR MODIFICATION

[76] Inventor: Mary Priore, 1574 Peace Pl., Columbus, Ohio 43209

[21] Appl. No.: 703,996

[22] Filed: Feb. 21, 1985

[51] Int. Cl.⁴ .............................................. G09B 19/00
[52] U.S. Cl. ..................................... 434/236; 446/327
[58] Field of Search ............... 434/156, 238, 236, 245, 434/257, 260, 429, 395, 396; 446/72, 73, 359, 361, 366; 223/92, 66, 68

[56] References Cited

U.S. PATENT DOCUMENTS 2,170,971  8/1939  Lodewick ............................ 434/396
3,831,295  8/1974  Mackay ............................... 434/236

OTHER PUBLICATIONS

Silent Valet D, p. 402, Fall 1960 General Merchandise Co. Catalog.

Primary Examiner—Harland S. Skogquist
Attorney, Agent, or Firm—Frank H. Foster

[57] ABSTRACT

A teaching aid which can be manipulated to demonstrate the principles involved in dealing with the human body and mind. The sides of a sheet of soft fabric are folded over itself towards its central axis to form a pair of separable flaps. The sheet is sewn together along its top to form shoulders and a pocket is attached to the interior of each flap, one labelled + and the other −. A simulated mirror or picture frame is attached at the top center and a pocket is formed on its exterior rear. A U-shaped sheet of soft fabric may be used surrounding the bottom and sides of the folded sheet. It is provided with gloves attached to the upper end of each leg of the U and downwardly extending tabs near the bends of the U which are used to extend into shoes.

11 Claims, 7 Drawing Figures

MOTIVATIONAL TEACHING AID FOR BEHAVIOR MODIFICATION

TECHNICAL FIELD

This invention relates to a teaching aid which is a display which can be used by an instructor or lecturer or by a private individual and more particularly relates to a teaching aid which can be manipulated before an audience or in privacy to demonstrate the principles involved in the operation of the human mind and body particularly when a person is learning to modify his or her own behavior.

BACKGROUND ART

Many, if not all, human beings have personality or behavior habits which they would like to modify or they have problems which they would like to learn to cope with. Typical of such problems are over consumption of food or alcoholic beverages, poor nutrition, lack of exercise or insufficient good health habits. Others may wish to quit smoking or deal with an unwanted pregnancy or an employment or career problem.

Educators have long recognized that visual aids not only make a presentation, discussion or lecture more enjoyable to the listeners, but additionally aid in conveying an understanding to the listeners and increase retention of information by listeners. However, in dealing with complicated subjects, such as the intellectual concepts involved in describing the human personality, it is particularly difficult to create physical objects which are easily related to the intellectual concepts and yet simple so they can be easily remembered by the listener and easily manipulated by the lecturer.

Experienced teachers recognize that it is considerably easier to teach people the facts about a problem such as alcoholism or poor nutrition, but considerably more difficult to teach them how to modify their behavior so that they act in the correct manner. Motivating people to a desired action requires an individual to examine such things as self image and to recognize an individual's responsibility for his actions. This requires an examination of such things as the positive and negative feelings which people feel about themselves. People must learn to understand the principles which direct human behavior in order to learn how to modify their behavior.

There is, therefore, a need for a motivational teaching aid for personal use or use by counselors, teachers and lecturers which will provide a simple illustration of the intellectual concepts involved in human psychology and which can be physically manipulated and actively used as a tool for teaching these concepts instead of merely hanging passively for observation.

BRIEF DISCLOSURE OF INVENTION

The invention is a motivational teaching aid which has a sheet of flexible material with its opposite sides folded over toward its central axis to form a pair of separable flaps and attached together near the top transversely of the fold to form a structure somewhat like a shirt having no sleeves and no front buttons, zippers or other fasteners. A pair of pockets are formed one on the interior surface of each of the flaps. A simulated mirror or picture frame is attached to the folded sheet material near the top and intermediate the fold lines in the symbolic position of a human face.

Preferably, the invention further includes a U-shaped sheet of material surrounding the bottom and sides of the folded sheet of material. The U-shaped sheet has a glove attached near the top of each leg of the U and a pair of downwardly protruding panels one near each bend or elbow portion of the U to symbolize legs.

The principal advantage of the present invention is that all the structural features of an embodiment simultaneously have a combination of advantages. The structural features are familiar to humans, are combined to have symbolic significance when related to the human personality and further have a functional purpose when they are manipulated by the lecturer for illustrating the principles applied when changing human personality or behavior habits.

Figure 1:
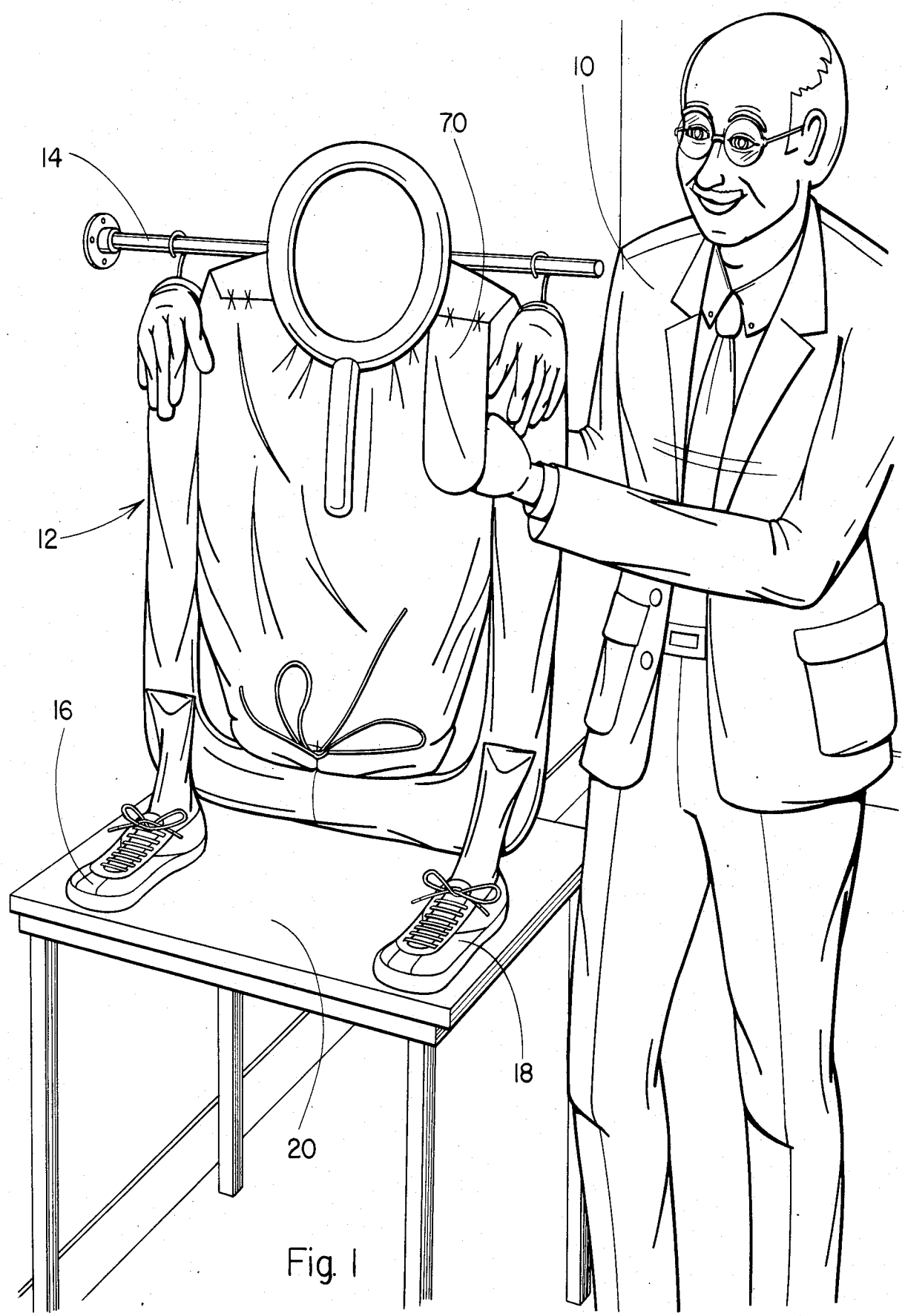
FIG. 1 is a view in perspective illustrating a lecturer utilizing a teaching aid embodying the present invention.
Figure 2:
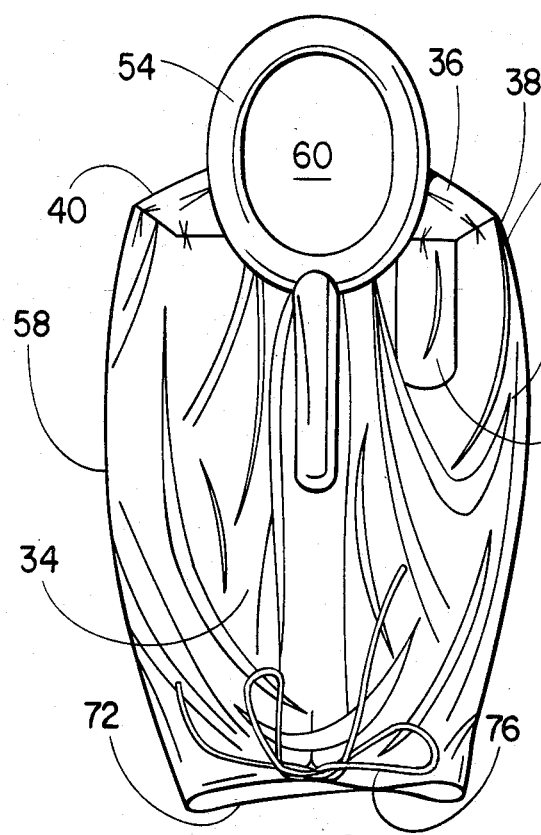
FIG. 2 is a front view of the preferred embodiment of the invention.
Figure 3:
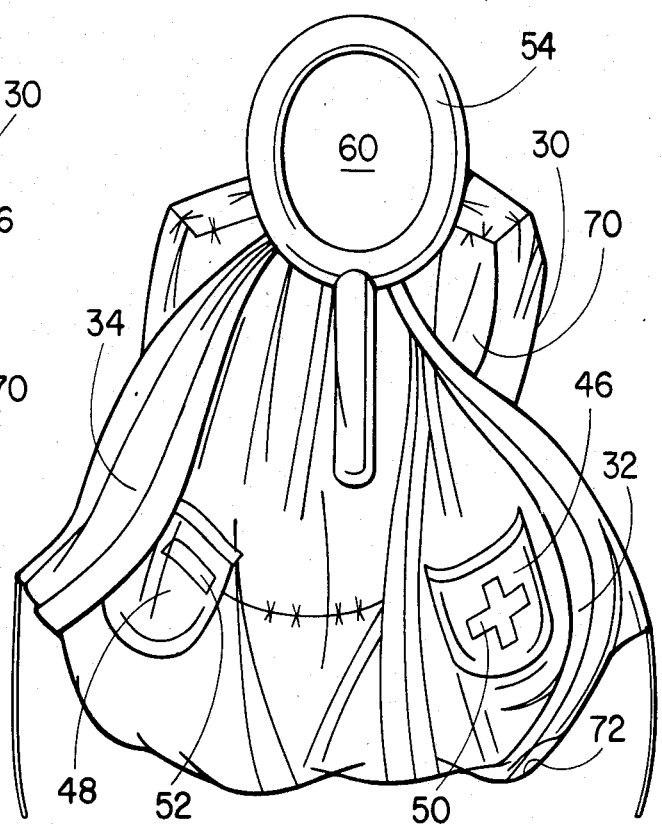
FIG. 3 is a front view of the embodiment illustrated in FIG. 2, but showing the flaps partially unfolded to reveal the interior pockets.
Figure 4:
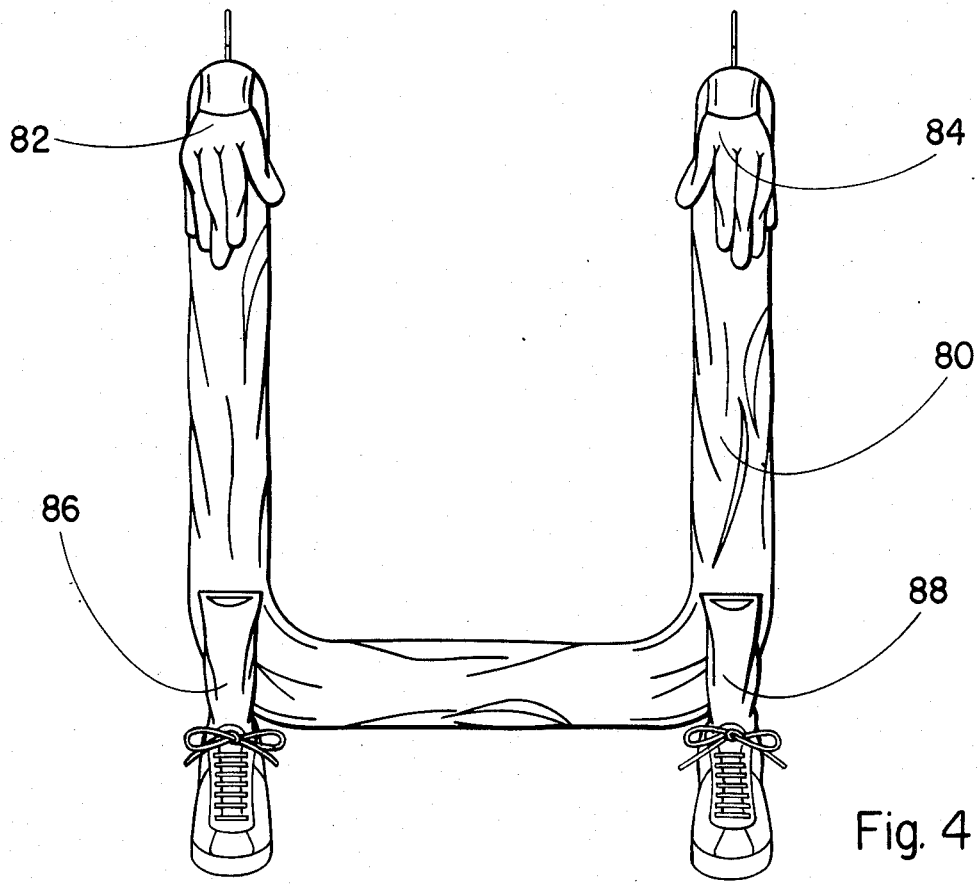
FIG. 4 is a front view illustrating the U-shaped sheet portion of the preferred embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 illustrates a lecturer 10 manipulating the preferred embodiment of the invention 12 which is hanging from a support bar 14 and extending into shoes 16 and 18 resting upon a table 20.

The details of the preferred embodiment are illustrated in more detail in FIGS. 2-7. The preferred embodiment comprises a sheet 30 of flexible material which is preferably a soft fabric, such as felt or flannel. The flexible sheet 30 has its opposite sides folded back towards its central axis to form a pair of separable flaps 32 and 34. The sheet material is attached together along its top 36 to form a pair of shoulder portions 38 and 40. The attachment is accomplished preferably by conventional sewing or stitching, although other well known means of attachment may be used. The flaps and the entire sheet can, alternatively, be formed as a unitary body making a separate stitching operation unnecessary.

Preferably, a small gap 42 is formed centrally along the top 36 to permit the insertion of a clothes hanger 44 into the upper portion of the folded sheet in much the same manner as a clothes hanger is inserted into a shirt or sweater. The hanger 44 then becomes a support for the teaching aid.

Sewn or otherwise fastened on the interior surface of each of the flaps 32 and 34 are a pair of pockets 46 and 48, one on each flap. Preferably, a mathematical plus symbol 50 is attached to one pocket and a mathematical minus symbol 52 is attached to the other to symbolize positive and negative things about the human personality. The pockets are formed on the inside of the flaps in order to represent the inner feelings and thoughts an individual has about himself or herself. These pockets permit a lecturer in a demonstration or an individual at home to write down such positive or negative feelings or characteristics about his personality on pieces of paper in order to recognize and accept them and then place them in the appropriate pocket to be used in the manner described below.

A simulated mirror or picture frame 54 is attached to the folded sheet near the top 36 and intermediate the fold lines 56 and 58. Preferably, a soft fabric 60 of a contrasting color, such as grey, is sewn within the frame 54. It is preferably nonreflective to symbolize that the important feature is not a person's appearance, but rather how one sees or feels about himself or herself. Emotion-indicating facial symbols, such as smiling or frowning mouths or a teary eye, may be attached to the surface 60 within the frame 54 during a lecture.

Figure 6:
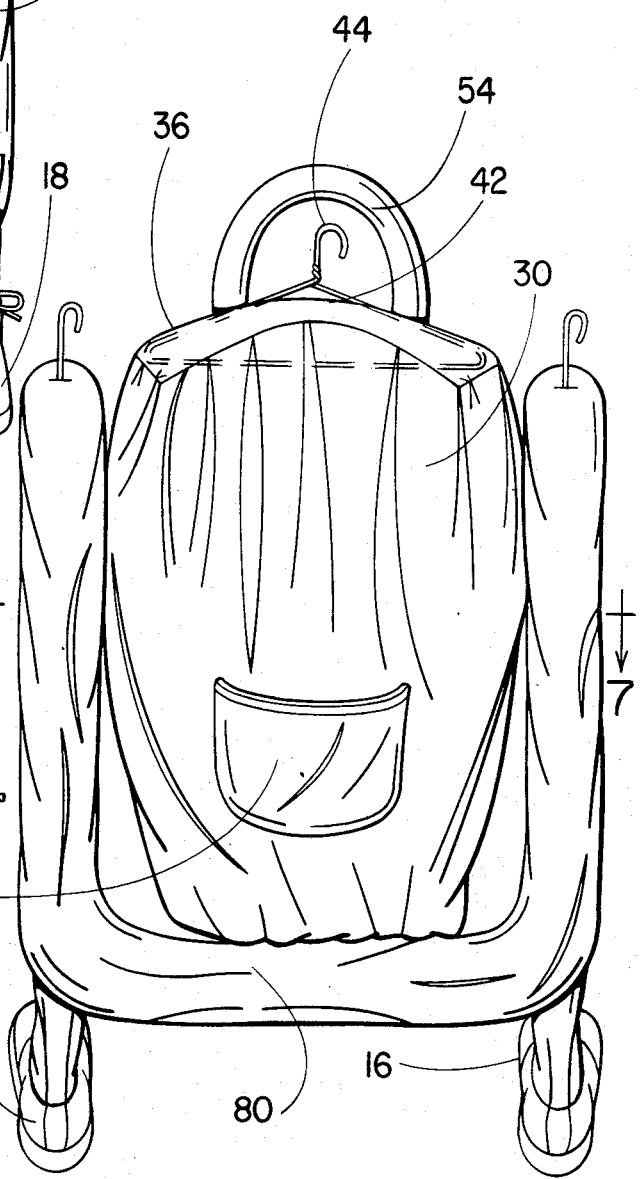
FIG. 6 is a rear view of the embodiment illustrated in FIG. 5.

As best revealed in FIG. 6, a pocket 62 is also sewn, or otherwise attached, on the exterior rear of the folded sheet 30. This permits the lecturer or an individual to remove a piece of paper upon which positive and negative personality characteristics or traits are written, from the inside pocket 48 and place it in the rear pocket signifying that the problem has been placed behind the individual and is no longer a problem. Advantageously, a tab 70 may be sewn into the seam along the top 36 for attachment of a paper bearing a negative trait, problem or feeling taken from the pocket 48 and attached on the tab 70, for example with a clothes pin, to signify that the individual is working on the problem.

Additionally, a drawstring 72, which includes the cord itself as well as the elongated tubular pocket through which it passes in the conventional manner, is formed around the bottom of the folded sheet 30 and may be tied together at a bow 76. The drawstring symbolizes the fact that a person's inner thoughts may be closed and locked against the outside world and even against the person himself or herself or, alternatively, may be open for examination, consideration and action by the individual.

Figure 5:
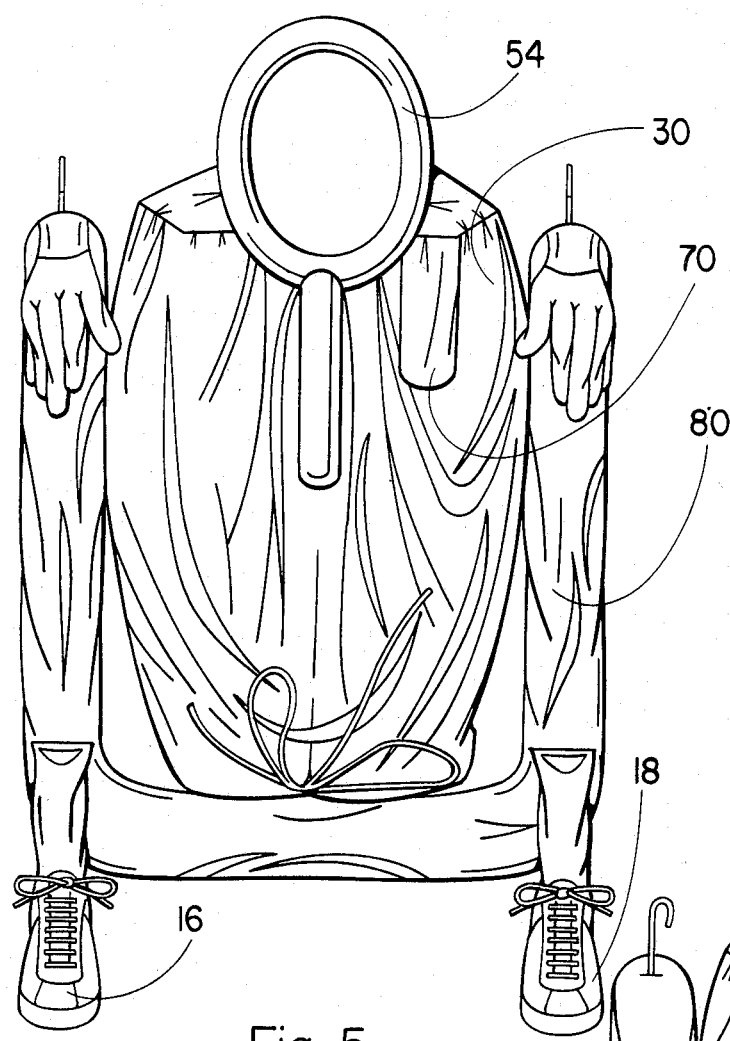
FIG. 5 is a front view illustrating the combined U-shaped portion and folded sheet portion of the preferred embodiment of the invention.
Figure 7:
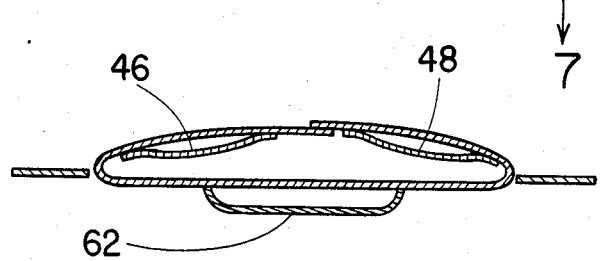
FIG. 7 is a view in horizontal section of the embodiment of FIG. 5 taken substantially along the line 7—7 of FIG. 6.

The invention is further enhanced by the inclusion of a U-shaped sheet 80 of material which surrounds the folded sheet 30 as illustrated in FIGS. 5 and 6. The U-shaped sheet 80 surrounds the folded sheet 30 on its bottom and sides and symbolizes the physical aspects rather than the mental aspects of a human being. The two are separately formed to illustrate the separateness of the mind from the body, yet may be positioned one within the other to symbolize the unity and cooperation of the two.

Preferably, a glove is attached at the upper end of each leg of the U-shaped sheet 80. Each of these gloves 82 and 84 symbolizes not merely human hands, but the ability of an individual to take an action to cause a change in his or her behavior, lifestyle or habits. I prefer that these be conventional gardening gloves to symbolize the doing of useful work and not merely a pretty appearance.

In addition, I prefer to provide a pair of downwardly extending panels 86 and 88 attached to the U-shaped sheet near each of its bended portions. These may be used during a lecture by positioning a pair of shoes 16 and 18 such that these downwardly extending panels 86 and 88 extend into the shoes thereby symbolizing human legs and feet. Preferably, these shoes are tennis shoes or other shoes associated with action because the panels 86 and 88 and the shoes are intended to symbolize human activity and the need of human beings to go places and do things to make things happen. They symbolize the philosophy that, if an individual expects things to happen for himself or herself, it is not sufficient to merely sit still and expect things to happen. An individual must be active, not passive.

As best illustrated in FIG. 6, fasteners are attached to the upper ends of the U-shaped sheet for attaching it to a support, such as the support rod 14, so that the entire embodiment of the invention may be supported during a lecture. Either part of the teaching aid or the entire unit may be removed and manipulated at the will of the lecturer to illustrate the various principles being explained.

Preferably, the entire embodiment of the invention is fabricated of a soft fabric, such as felt or flannel, although other flexible materials may be used. The use of flexible soft materials provides a soft, pleasant touch to a human being so that it will feel comfortable and suggests that an individual must learn to become comfortable with all of the feelings and thoughts which come together to create the human personality.

In addition to the advantageous uses which a lecturer can make of an embodiment of the invention in illustrating the principles being discussed, the use of the flexible, fabric-type material permits the entire teaching aid to be easily and conveniently folded into a small package and hand carried to and from a lecture, quite unlike many educational visual aids.

Of course, a variety of modifications may be made without departing from the spirit of the invention. For example, embodiments of the invention may be made in a variety of different sizes, a substantially smaller size being more convenient for use at home and more appropriate for children. Symbols, such as a heart shape, may be positioned on the exterior.

As a lecturer utilizes an embodiment of the invention not only may the components of the human personality be discussed and illustrated but in addition, the dynamic changes which are needed may also be illustrated. The components are illustrated inasmuch as each part of the structure symbolizes a different part of the human personality. However, the recognition of these components of the human personality is not sufficient inasmuch as it is the purpose to create dynamic changes which can be made only by the individual who is in control of that personality and body.

The lecturer, for example, may suggest that all individuals have both good traits or characteristics and good feelings about themselves and in addition have undesirable or negative feelings about themselves. An individual may write some of these down and place the piece of paper upon which they are written in the appropriate pocket 46 or 48. The lecturer may refer to the need to keep these in balance having neither too many nor too few of either plus or minus characteristics or feelings. A balance is, of course, illustrated and symbolized by the left and right of center positioning of the pockets. The lecturer may suggest that an individual piece of paper upon which a negative characteristic is written may be withdrawn and attached to the flap 70 by a conventional clothes pin or other fastener while the individual is working upon that trait. The individual may choose to place the paper back into the pocket 48 and take a recess from working on that problem. However, after the individual feels that the problem is solved, the paper is moved to the rear pocket 62 to illustrate that the individual has put the problem behind him or her. The plus and minus labelled pockets 46 and 48 are on the inside of the flap to illustrate that a person is not required to reveal these thoughts and feelings to others, but they may be maintained in private.

While certain preferred embodiments of the present invention have been disclosed in detail, it is to be understood that various modifications may be adopted without departing from the spirit of the invention or scope of the following claims.

I claim:

1. A motivational teaching aid comprising:
   (a) a flexible sheet material forming a body having its opposite sides extending over a back portion toward its central axis to form a pair of separable flaps which are attached to the rear portion at its top and sides to form a pair of shoulders;
   (b) a pair of pockets one formed on the interior surface of each of said flaps; and
   (c) a simulated, nonreflective fabric mirror or picture frame having a relatively flat central portion and attached directly to said flexible sheet body near said top and intermediate said sides in a position corresponding to and symbolic of a human face.

2. A teaching aid in accordance with claim 1 wherein a central gap is formed along the top to permit insertion of a hanger.

3. A teaching aid in accordance with claim 1 wherein a rear pocket is formed on the exterior of the central rear portion of said body.

4. A motivational teaching aid comprising:
   (a) a flexible sheet material forming a body having its opposite sides extending over a back portion toward its central axis to form a pair of separable flaps which are attached to the rear portion at its top and sides to form a pair of shoulders;
   (b) a pair of pockets one formed on the interior surface of each of said flaps; and
   (c) a simulated frame attached to said body near said top and intermediate said sides
wherein a central gap is formed along the top to permit insertion of a hanger, wherein a pocket is formed on the exterior back of the central rear portion of said body, wherein a plus symbol is fastened to the exterior of one of said interior pockets and a minus symbol to the exterior of the other and wherein all of said recited structures except said hanger are formed of a soft fabric.

5. A teaching aid in accordance with claim 4 wherein a drawstring is formed around the bottom of said body.

6. A motivational teaching aid comprising:
   (a) a flexible sheet material forming a body having its opposite sides extending over a back portion toward its central axis to form a pair of separable flaps which are attached to the rear portion at its top and sides to form a pair of shoulders;
   (b) a pair of pockets one formed on the interior surface of each of said flaps;
   (c) a simulated frame attached to said body near said top and intermediate said sides; and
   (d) a U-shaped sheet of material for surrounding said body on its bottom and sides.

7. A teaching aid in accordance with claim 6 wherein a glove is attached at each upper end of said U-shaped sheet.

8. A teaching aid in accordance with claim 7 wherein a fastener is also attached to each upper end of said U-shaped sheet for attaching it to a support.

9. A teaching aid in accordance with claim 7 wherein a pair of downwardly extending panels are attached to said U-shaped sheet near its bended elbow portion.

10. A teaching aid in accordance with claim 7 wherein all of said recited structures are formed of soft fabric.

11. A teaching aid in accordance with claim 4 further comprising a U-shaped sheet of material for surrounding said body on its bottom and sides, wherein a glove is attached at the upper ends of said U-shaped sheet, wherein fasteners are also attached to the upper ends of said U-shaped sheet for attaching it to a support, wherein a pair of downwardly extending panels are attached to said U-shaped sheet near its bended elbow portion and wherein all of said recited structures are formed of soft fabrics.

* * * * *